S. YUASA.
WINDOW CLEANER.
APPLICATION FILED JAN. 15, 1921.
1,382,875.
Patented June 28, 1921.
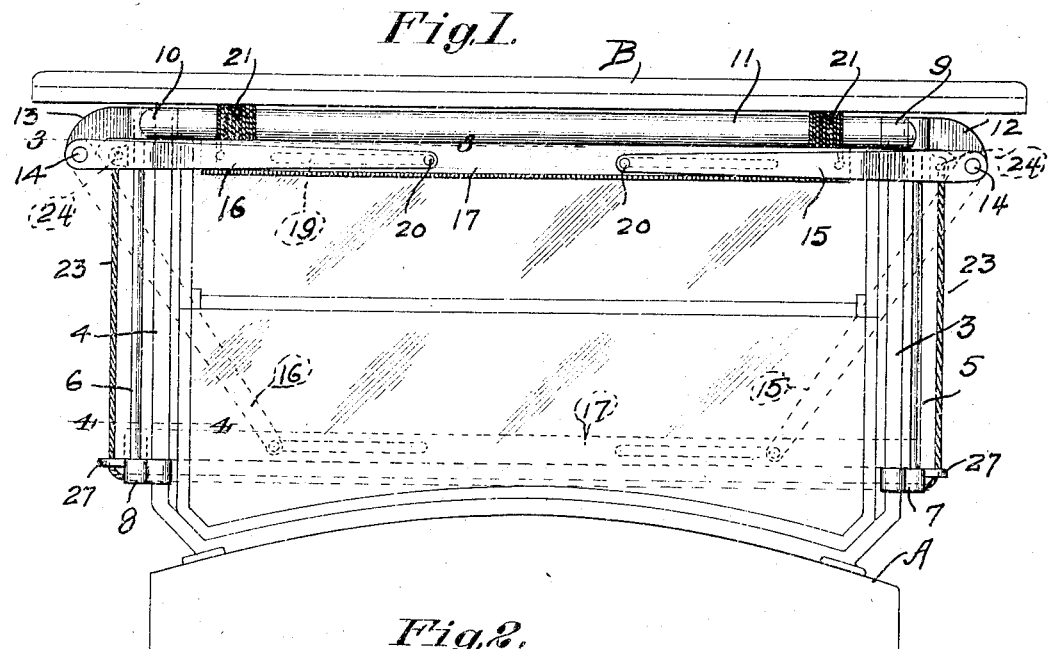
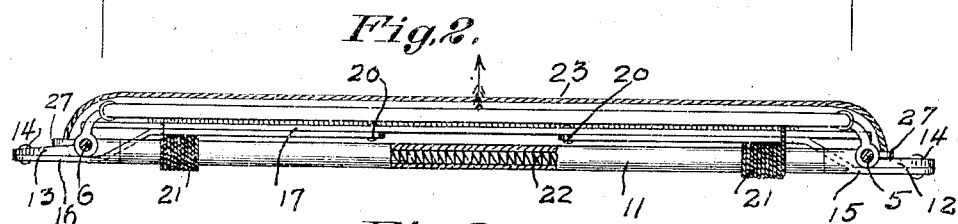
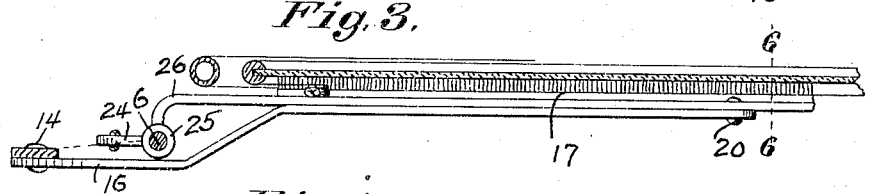
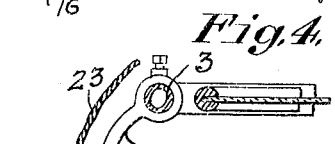
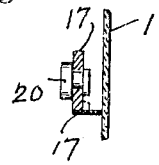
Inventor.
Shinkichi Yuasa

UNITED STATES PATENT OFFICE.

SHINKICHI YUASA, OF CUPERTINO, CALIFORNIA.

WINDOW-CLEANER.

1,382,875.  Specification of Letters Patent.  Patented June 28, 1921.

Application filed January 15, 1921. Serial No. 437,488.

*To all whom it may concern:*

Be it known that I, SHINKICHI YUASA, a subject of the Emperor of Japan, and a resident of Cupertino, in the county of Santa Clara and State of California, have invented a new and useful Window-Cleaner, of which the following is a specification.

My invention while relating in general to window cleaners has reference more particularly to means for mechanically cleaning accumulations of snow, sleet, rain and the like from the surface of windshields or other windows so as to leave a clear vision through which the conductor of the vehicle may clearly observe the road and traffic.

The primary object of my invention is to provide means which may be conveniently manipulated from the driver's seat for quickly cleaning practically the entire surface of the windshield or window by a stroke of the wiping device.

For the purpose of illustration I have shown my improved device in the accompanying drawing as applied to a windshield of a motor vehicle but the salient features of the same are in no way limited to this particular adaptation as the advantages of the same may be fully realized in other instances, such as car windows or any other transparent look-outs which are subjected to the weather elements and must be kept clean to leave a clear vision.

In said drawing:—

Figure 1 is a front elevation of a windshield for motor vehicles illustrating the application of the invention;

Fig. 2 is a horizontal section;

Fig. 3 is also a horizontal section on the line 3—3 Fig. 1;

Fig. 4 is still another horizontal section on the line 4—4 Fig. 1;

Fig. 5 is a detail view of the bracket member; and

Fig. 6 is a transverse section on the line 6—6 Fig. 3.

Referring now to the drawing in detail as is customary, in motor vehicles of both the pleasure and commercial type, the windshield is supported above the dash, outlined as at (A), and extends in close proximity to the top represented as at (B). The shield usually includes two divided sections (1) and (2) made of glass with the upper section overlapping the lower section thereof at the horizontal division line. The two sections are properly confined in a suitable frame embodying in its construction a pair of uprights such as (3) and (4). Each of the sections are so confined in the frame that they may be swung inwardly and outwardly independent of each other for ventilating or other purposes. However for protection against wind and wet weather, the sections assume substantially a perpendicular position as shown.

While there have been various samples of windshield cleaning devices most of them have fallen short of providing a practical solution of the problems involved for instance, those which attempt to clean the entire surface of the shield involve such a complicated arrangement of parts which make their use prohibited and those which are simple in construction do not wipe a sufficient area of the shield surface to leave an unobstructed vision from various angles. The device which I have in mind while cleaning practically the entire windshield surface, is simple in construction and operation and does not look unsightly when applied. The device may be sold as an attachment and may be easily applied and removed at will and it does not need to become a permanent part of the vehicle.

In its preferred form it comprises a pair of upright bracket members (5) and (6) which correspond to some extent to the uprights (3) and (4) of the windshield frame. These bracket members (5) and (6) may be supported parallel to the frame members (3) and (4) and fixed thereto by mounting clips (7) and (8) on their lower ends with the upper ends of the uprights mounted in a frame member which includes journal bearings (9) and (10) for the roller (11). The ends of this upper support extend outwardly from the windshield frame and the uprights (5) and (6) and terminate in downwardly presented attaching ears (12) and (13) for the pintles (14) which are made to pass through the fixed end of the arms (15) and (16) for pivoting the arms to the ears. The opposite ends of the arms (15) and (16) are pivoted to the wiper bar (17) which is arranged on the outside of the windshield and supported horizontally in contact with the shield surface so that the felted or the like part of the wiper bar will bear against the shield surface. The arms (15) and (16) are secured to the wiper bar through a pin and slot connection made by providing a pair of relatively long slots (18) and (19)

in the wiper bar with the pintles (20) of each arm (15) and (16) confined free to slide in these slots.

The wiper bar has cords (21) or the like adjacent its respective ends and wound upon the roller (11) with the end thereof fixed to the roller so that the spring (22) housed within the roller may wind the cord upon the roller to return the wiper bar (17) to its inactive or normal position adjacent the roller. The spring (22) coöperates with the roller (11) in practically the same manner as a curtain roller and the roller is supported in the journals (9) and (10) with freedom of rotation.

As a convenient means of manipulating the wiper bar downwardly across the surface of the windshield to clean the same, I propose to use a looped pull cord (23), the two ends of which being fastened to the outwardly presented extensions (24) of the collars (25) which slide on the rods (5) and (6) with the arms (26) connecting the collars with the wiper bar (17). The cord (23) is passed downwardly on the outside of the opposite ends of the windshield through the guides (27) then in back of the windshield where it extends horizontally in convenient position so that it may be grasped by the chauffeur. By imparting a pull to the cord it will slide the collars (25) downwardly on the rods (5) and (6) and thus pull the wiper bar (17) downwardly across the surface of the shield and against the influence of the spring roller (11). The wiper bar is guided in its movement by the arms (15) and (16) as best shown in dotted lines in Fig. 1. When the operator releases the pull on the cord, the influence of the spring (22) of the roller (11) will wind the cords (21) upon the roller thus imparting an upward pull on the wiper bar returning it to normal or inactive position.

The construction, operation and advantages of the idea should be fully understood from the above. It is to be understood that I do not limit myself to the particular construction shown and described as obviously certain detail changes may be made without departing from the spirit of the invention as covered in the subjoined claim.

Claim—

In a device of the class described, a cleaning device including a supporting frame adapted to be attached to a windshield frame of an automobile, a spring roller journaled in the top of the supporting frame, a wiper bar mounted free to be moved vertically up and down relatively to the supporting frame and in wiping contact with the windshield, a cord connecting the wiper bar with the spring roller with the cord wound upon the roller under control of the spring thereof, a pull cord for moving the wiper bar downwardly over the windshield against the influence of the spring in the roller, and arms pivoted to the top of the supporting frame and having a pin and slot connection with the wiper bar for holding the wiper bar in contact with the windshield when the same is moved over the surface thereof.

SHINKICHI YUASA.